Patented Dec. 6, 1949

2,490,536

UNITED STATES PATENT OFFICE 2,490,536

MOISTUREPROOF HEAT SEALING LACQUER

Clyde G. Murphy, Raritan Township, Middlesex County, N. J., and John P. Sermattei, Wilmington, Del., assignors to E. I. du Pont de Nemours & Company, Wilmington, Del., a corporation of Delaware No Drawing. Application August 13, 1947,
Serial No. 768,503

13 Claims. (Cl. 260—3.5)

This invention relates to moistureproof heat sealing compositions and more particularly to moistureproof heat sealing compositions for use on flexible sheet materials such as paper, metal foils, regenerated cellulose film, cellulose acetate, ethyl cellulose, and other transparent films.

Moistureproofing compositions based on nitrocellulose to which has been added plasticizers, resins and a minor amount of moistureproofing wax are well known in the art. Some of these compositions are heat sealing as well as moistureproofing. Moistureproof heat sealing lacquers based upon nitrocellulose have a quite desirable combination of properties and have long been used commercially. However, they do suffer from certain defects; notably, borderline blocking resistance at a satisfactory range of heat sealing temperatures, inferior retention of moistureproofness after crumpling and being sensitive to minute variations in the proportions of the ingredients which tends to make their manufacture to a uniform quality quite difficult.

This invention has as an object the provision of a new type of heat sealing moistureproofing coating. A further object is the provision of a moistureproof heat sealing composition for use on flexible sheet materials which is glossy, transparent, non-tacky, free from odor and is non-toxic. A still further object of this invention is the provision of a coating having improved moistureproofness over the best nitrocellulose coatings both initially and after crumpling. A still further object of this invention is the provision of a coating having improved heat sealing properties combined with improved resistance to blocking. A further object is the provision of a coating having improved low temperature flexibility. Another object is the provision of a coating which is less sensitive to slight variations in the proportions of the ingredients so that the manufacture of a product of uniform quality is facilitated. Other objects will appear hereinafter.

By the term "heat sealing," as applied to the coatings herein described, is meant the property of softening or fusing to form a satisfactory bond when subjected to momentary application of heat and pressure. The temperatures normally employed range from 100° C. to 200° C., the pressure varies from less than a pound to 50 pounds or more per square inch, and the time of dwell from a fraction of a second to several seconds.

In the laboratory these conditions have been standardized by superposing two coated strips several inches long and 1 inch wide coated side to coated side upon a platen heated to 125° C. A cushioned weight which applies a uniform pressure of 2 pounds per square inch is placed on the superposed strips for 5 seconds. The free ends are then placed in a tensile strength machine and pulled in opposite directions. A bond strength of 40 grams per inch width is considered satisfactory for many purposes, but the compositions herein disclosed give very much higher values generally, and in cases in which glassine paper is coated, the paper usually tears before the bond fails.

These objects are accomplished by mixing chlorinated rubber, a specific rubbery type synthetic resin and a moistureproofing wax to prepare a composition which yields coatings that are glossy, transparent, non-smearing, non-tacky, flexible, odor-free, moistureproof, heat sealable, non-blocking and non-toxic.

Conventional plasticizers such as dibutyl phthalate, tricresyl phosphate, etc., when used with chlorinated rubber, fail to yield coatings which are heat sealable, and it was not until the discovery of a specific type of resinous, rubbery plasticizer that the objects of this invention could be accomplished.

The specific resinous plasticizer is the rubbery copolymer resulting from the copolymerization of ethylene and vinyl acetate, preferably one containing three mols of ethylene to one mol of vinyl acetate. However, copolymers containing ratios of ethylene to vinyl acetate ranging from 1 to 10 mols of ethylene to 1 mol vinyl acetate can be used. The preferred copolymers fall in the range of 2 to 5 mols ethylene to 1 mol vinyl acetate. As the ethylene to vinyl acetate ratio goes above 8 to 1, the solubility at ordinary temperatures decreases and mild heating up to about 60° C. is necessary to effect complete solution. At ratios below 1 mol ethylene to 1 mol vinyl acetate, unsatisfactory solubility is obtained, and with straight polyvinyl acetate (0 mol ethylene) moistureproofness and heat-sealability are definitely unsatisfactory.

Partially hydrolyzed copolymers of ethylene and vinyl acetate are likewise unsatisfactory, since these require alcohol in the solvent mixture to effect solution and are therefore not compatible with chlorinated rubber. The viscosities of these ethylene-vinyl acetate copolymers may vary, but the preferred resin gives a viscosity of 20 centipoises at 25° C. for a 10% solution in toluene. However, higher or lower viscosity resins can be used. So far as we have been able to determine, these ethylene-vinyl acetate copolymers are unique in the properties they impart to the compositions of this invention, and we believe no other common resinous or rubbery materials produce equivalent results.

These ethylene-vinyl acetate copolymers may be prepared by way of illustration in the following manner:

In a stainless steel shaker tube are charged 125 parts of vinyl acetate monomer, and 0.2 part of benzoyl peroxide. The tube is closed, flushed with oxygen-free nitrogen, evacuated, and then filled with ethylene under about 500 atmospheres.

The tube and contents are heated to 70° C. and held at this temperature for about 9 hours. Under these conditions, the pressure of the tube is in the range of 850–1000 atmospheres, and is held within this range by adding ethylene under pressure as needed. At the end of the reaction period, about 80 parts of polymer is obtained. This polymer will have a composition of about 3:1 ethylene: vinyl acetate on a molar basis. In practical operations it is desirable in many cases to introduce water in substantial amounts along with the vinyl acetate.

The preparation of ethylene-vinyl acetate copolymers as described in U. S. Patent 2,200,429 and also in applications Hanford and Roland S. N. 446,116, filed June 6, 1942, and Hanford and Roland S. N. 453,036, filed July 31, 1942, and now abandoned, may also be followed in the present invention.

A moistureproofing wax is also necessary, and we prefer to use a paraffin wax, preferably one which has a fairly high melting point. The paraffin waxes which have been found to give particularly good results are: (1) Aristo Wax #147 which is a fully refined domestic paraffin having a melting point of 60–64° C. and manufactured by the Union Oil Company and (2) Asiatic paraffin with a melting point not less than 60° C. manufactured by the Asiatic Petroleum Company. Other paraffin waxes with lower melting points can also be used where extremely high moistureproofness is not required. Spermaceti, ceresin and the so-called amorphous or microcrystalline waxes can also be used.

In addition to the essential ingredients, which are chlorinated rubber, ethylene-vinyl acetate copolymer and moistureproofing wax, a purely optional ingredient is a compatible resin which is useful in improving the adhesion to some surfaces. Various resins can be used for this purpose, and those that we have found to be satisfactory are chlorinated paraffins containing 42–43% chlorine, coumarone-indene resins having a melting point of about 150° C., maleic anhydride modified resins having a melting point of 105–120° C., phenol-formaldehyde modified resins having a melting point of 121–129° C., hydrogenated ester gum having a melting point of 80–85° C., ester gum, a glycerol esterified resin with a melting point of 78–86° C., polymerized rosin with a melting point of 70–80° C., terpene resins with a melting point of about 98° C., and natural damar resin. In these case where a considerable proportion of the solid ingredients consists of a resin which may be subject to oxidation, it may be desirable to introduce a small amount of an anti-oxidant to improve the aging properties of the coating.

The preferred and operative ratios of these ingredients are tabulated below:

|  | Preferred | Operative |
|---|---|---|
|  | Per cent | Per cent |
| Chlorinated rubber | 40 | 25–70 |
| Ethylene/vinyl acetate copolymer | 40 | 10–55 |
| Blending resin |  | 0–60 |
| Moistureproofing wax | 20 | 1–45 |

By the term "chlorinated rubber" as used in this disclosure, we mean chlorinated natural rubber such as the product known as "Parlon" and sold by the Hercules Powder Company or chlorinated synthetic rubber such as the product known as "Parlon X" as sold by the Hercules Powder Company. This is a product resulting from the chlorination of the copolymer of butadiene and styrene. Another material equivalent to chlorinated natural rubber is after chlorinated polymerized chloroprene with a chlorine content preferably above 57%. In the case of the chlorinated natural rubber, we prefer to use a material having a viscosity of 125 cps. although chlorinated natural rubbers in the viscosity range of 20–2000 cps. can be used. These viscosities refer to the viscosity of a 20% solution by weight of chlorinated rubber in toluene at 25° C. In the case of the other chlorinated synthetic elastomeric materials, approximately the same viscosity ranges have been found to be operative. In the claims these materials are referred to as "chlorinated elastomers." The following examples are given to illustrate the invention, but it is not limited thereto:

*Example I*

| | Per cent |
|---|---|
| Ethylene-vinyl acetate copolymer (3:1) | 12 |
| 125 cps. grade chlorinated natural rubber | 12 |
| Refined paraffin (M. P. 60–64° C.) | 6 |
| Toluene | 70 |

These ingredients were mixed together at room temperature until a homogeneous solution was obtained. The order of mixing is not critical, but it is preferable first to dissolve the ethylene-vinyl acetate copolymer which requires vigorous agitation and then add the other ingredients and continue stirring until complete solution is achieved. This solution was coated on glassine paper at room temperature to give a coating weight of three pounds of solids per 3000 square feet distributed on the two sides of the sheet. The coating was dried for 30 seconds at a temperature of 100° C., drying occurring entirely by solvent evaporation. The coated paper had excellent gloss and transparency, was non-tacky, flexible and free from odor. It gave excellent heat sealing bonds over a temperature range of 100 to 150° C., the bonds being sufficiently strong to cause the paper to tear when the heat sealed strips were pulled apart. The coated paper also showed no blocking or marring when stacks of coated sheets were subjected to a pressure of 0.3 pound per square inch at 120° F. for a period of 24 hours. The coated paper was tested for moisture vapor permeability, and a value of 20 grams per 100 square meters per hour at 39.5° C. was obtained under a vapor pressure differential corresponding to 100% relative humidity on one side of the sheet and less than 3% on the other as determined in accordance with the procedure described in the Paper Trade Journal of October 3, 1935, pages 31–39. After folding into one inch squares, the same paper had a permeability value of 55 grams under the same test conditions. When the coated paper was subjected to a temperature of −20° F., the flexibility of the coating remained excellent and was definitely superior in this respect to the best nitrocellulose type moistureproof, heat sealing lacquer coating.

*Example II*

| | Per cent |
|---|---|
| Ethylene/vinyl acetate copolymer (3:1) | 14.1 |
| 125 cps. grade chlorinated natural rubber | 14.1 |
| Refined paraffin (M. P. 60–64° C.) | 1.8 |
| Toluene | 70.0 |

This composition when prepared and applied to glassine paper in the manner described for the composition disclosed in Example I gave a coated paper with physical properties very similar to the paper coated with the composition disclosed in Example I, except that the moisture transfer rate in this case was 32 grams per 100 square meters per hour.

Example III

| | Per cent |
|---|---|
| Ethylene/vinyl acetate copolymer (3:1) | 11.7 |
| 125 cps. grade chlorinated natural rubber | 11.7 |
| Chlorinated paraffin (42–43% chlorine) | 4.8 |
| Refined paraffin (60–64° C.) | 1.8 |
| Toluene | 70.0 |

This composition when prepared and applied to glassine paper in the manner described for the composition disclosed in Example I gave a coated paper with physical properties very similar to the paper coated with the composition disclosed in Example I.

Example IV

| | Per cent |
|---|---|
| Ethylene-vinyl acetate copolymer (3:1) | 11.7 |
| 125 cps. grade chlorinated natural rubber | 11.7 |
| Rosin maleic acid glyceride | 4.8 |
| Refined paraffin (60–64° C.) | 1.8 |
| Toluene | 70.0 |

This composition when prepared and coated on glassine paper in the manner described for Example I gave a coated paper with physical properties very similar to the paper coated with the composition disclosed in Example I.

Example V

| | Per cent |
|---|---|
| Ethylene-vinyl acetate (3:1) | 11.7 |
| 66 cps. chlorinated copolymer of butadiene and styrene | 11.7 |
| Chlorinated paraffin (42–43% chlorine) | 4.8 |
| Refined paraffin (60–64° C.) | 1.8 |
| Toluene | 70.0 |

This composition when prepared and coated on glassine paper in the manner described for Example I gave a coated paper with physical properties very similar to the paper coated with the composition disclosed in Example I.

Example VI

| | Per cent |
|---|---|
| Ethylene-vinyl acetate copolymer (3:1) | 11.7 |
| 250 cps. grade chlorinated chloroprene (chlorine content 66.5%) | 11.7 |
| Chlorinated paraffin (42–43% chlorine) | 4.8 |
| Refined paraffin (60–64° C.) | 1.8 |
| Toluene | 70.0 |

This composition when coated on glassine paper in the manner described for the composition disclosed in Example I gave a coated paper with physical properties very similar to the paper coated with the composition disclosed in Example I.

Example VII

| | Per cent |
|---|---|
| Ethylene-vinyl acetate copolymer (3:1) | 7.8 |
| 125 cps. grade chlorinated natural rubber | 15.6 |
| Chlorinated paraffin (42–43% chlorine) | 4.8 |
| Refined paraffin (60–64° C.) | 1.8 |
| Toluene | 70.0 |

This composition when coated on glassine paper in the manner described for the composition disclosed in Example I gave a coated paper with physical properties similar to the paper coated with the composition disclosed in Example I except that the blocking resistance is somewhat improved while the heat sealing temperature threshold is somewhat raised.

Example VIII

| | Per cent |
|---|---|
| Ethylene-vinyl acetate copolymer (3:1) | 14.0 |
| 125 cps. grade chlorinated natural rubber | 9.4 |
| Chlorinated paraffin (42–43% chlorine) | 4.8 |
| Refined paraffin (M. P. 60–64° C.) | 1.8 |
| Toluene | 70.0 |

This composition when coated on glassine paper in the manner described for the composition disclosed in Example I imparts physical properties similar to paper coated with the composition disclosed in Example I except that the heat sealing temperature threshold is slightly lower while the blocking resistance is slightly impaired.

While it is preferable for most purposes to apply these coatings as solutions in organic solvents, it will be apparent to those skilled in the art that with some modifications in the proportions of the solid ingredients, these compositions can be applied in the molten state as hot melts. In this case the solvent and the drying operations are eliminated.

The coating compositions of this invention, when applied to glassine and various other types of paper, to regenerated cellulose, ethyl cellulose, cellulose acetate, polyethylene and to other types of transparent films, and to metal foils, produce wrapping materials which are useful for packaging a wide range of products. For example these coated sheets can be used to protect foodstuffs such as bread, cakes, etc. against moisture loss or conversely to protect such products as potato chips, popcorn, peanuts, etc. against moisture gain. By virtue of their heat sealing properties these coated films can be used to produce hermetically sealed packages on automatic wrapping machines without the use of an additional adhesive. In addition to enhancing the appearance and sales appeal of products packaged in this manner, these packages will stand more handling and crumpling without the loss of moistureproofing qualities and can be subjected to low temperatures such as is required in the frozen food industry with good retention of all protective properties. Furthermore, films coated with these compositions can be stored at high summer temperatures, or under conditions existing in the tropics without danger of the coated films adhering to each other or blocking. By virtue of the excellent heat sealing properties of these compositions, it is possible to operate automatic wrapping machines at a faster speed and to obtain satisfactorily sealed packages over a wide range of heat sealing temperatures, making the adjustment of the temperature of the heat sealing machines less critical and their operation more foolproof. In addition because the ratio of the ingredients to each other is less critical in these compositions than for nitrocellulose type moistureproof heat sealing lacquers, manufacture of batches of uniform quality is greatly facilitated.

By the term "moistureproof," we mean a degree of impermeability of the coated paper to water vapor of less than about 600 grams per 100 square meters per hour over a 24 hour period at 39.5 degrees (plus or minus 0.5° C.) as a humidity differential of at least 95% when glassine paper is coated on both sides with a total weight of 3 pounds of non-volatile coating per 3000 square feet. Ordinarily in moistureproofing regenerated cellulose, a value of 570 grams per hour under the same conditions is considered satisfactory.

With respect to the amount of coating necessary, some variation exists due to the porosity and smoothness of the paper base. Ordinarily 3 pounds of coating solids per 3000 square feet coated on both sides is satisfactory on a very dense, smooth paper such as glassine. On regenerated cellulose and similar non-fibrous, smooth films, as little as 2 pounds per 3000 square feet coated on both sides may be used. On the other hand on more porous papers, the amount of coating may be increased to weights above 10 to 12 pounds, but in commercial runs, these coating weights may be uneconomical and have more tendency to block.

It is apparent that many widely different embodiments of this invention may be made without departing from the spirit and scope thereof, and therefore, it is not intended to be limited except as indicated in the appended claims.

We claim:

1. A composition for rendering paper, regenerated cellulose and the like, moistureproof and heat sealing which comprises from 25–70% of chlorinated rubber, 10–55% of a copolymer of ethylene and vinyl acetate and from 1–45% of a wax.

2. The composition of claim 1 in which a compatible resin is present in amount up to 60%.

3. The composition of claim 1 which contains 40% chlorinated rubber, 40% of an ethylene-vinyl acetate copolymer in which the molecular ratio is from 2 to 5 mols of ethylene to 1 mol vinyl acetate and 20% of a moistureproofing wax having a melting point above 60° C.

4. The composition of claim 1 in which the molecular ration of ethylene to vinyl acetate in the copolymer is between 1 and 10 mols of ethylene to each mol of vinyl acetate.

5. The composition of claim 1 in which the molecular ratio of ethylene to vinyl acetate in the copolymer is between 2 and 5 mols of ethylene to 1 mol of vinyl acetate.

6. The composition of claim 1 in which the wax is paraffin and has a melting point above 60° C.

7. A thin flexible pellicle having a coating of from 2 to 12 pounds per 3000 square feet of the composition of claim 1 on a non-volatile basis.

8. The article of claim 7 in which the pellicle is regenerated cellulose.

9. The article of claim 7 in which the pellicle is paper.

10. The article of claim 7 in which the pellicle is glassine paper.

11. The article of claim 7 which has a moistureproofness of less than 600 grams per 100 square meters per hour.

12. The article of claim 7 which is heat sealable.

13. A glassine paper which has been rendered heat sealing and moistureproof by an adherent film of a composition having the following composition in parts by weight:

Ethylene-vinyl acetate copolymer (3:1) _____ 12
Chlorinated natural rubber (125 centipoises) __ 12
Refined paraffin (M.P. 60–64° C.) _____ 6

CLYDE G. MURPHY.
JOHN P. SERMATTEI.

REFERENCES CITED

The following references are of record in the file of this patent:

UNITED STATES PATENTS

| Number | Name | Date |
|---|---|---|
| 2,200,429 | Perrin et al. | May 14, 1940 |
| 2,233,090 | Asnes et al. | Feb. 25, 1941 |